United States Patent
Lee et al.

(10) Patent No.: US 8,509,304 B2
(45) Date of Patent: Aug. 13, 2013

(54) VIDEO ENCODING METHOD AND APPARATUS, AND VIDEO DECODING METHOD AND APPARATUS

(75) Inventors: Yun-gu Lee, Yongin-si (KR); Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 814 days.

(21) Appl. No.: 12/204,903

(22) Filed: Sep. 5, 2008

(65) Prior Publication Data

US 2009/0190659 A1 Jul. 30, 2009

(30) Foreign Application Priority Data

Jan. 25, 2008 (KR) .................. 10-2008-0008029

(51) Int. Cl.
*H04N 7/12* (2006.01)
(52) U.S. Cl.
USPC ............ 375/240.12; 375/240.16; 375/240.17; 348/699; 348/700; 348/701
(58) Field of Classification Search
USPC . 375/240.12, E07.243, 16, 17; 348/699–701
See application file for complete search history.

(56) References Cited

U.S. PATENT DOCUMENTS

| | | | | |
|---|---|---|---|---|
| 5,835,237 A * | 11/1998 | Ebrahimi | ............. | 358/448 |
| 6,519,289 B1 | 2/2003 | Bruck | | |
| 7,336,720 B2 * | 2/2008 | Martemyanov et al. | . | 375/240.12 |
| 2002/0064228 A1 * | 5/2002 | Sethuraman et al. | .... | 375/240.12 |
| 2003/0194010 A1 | 10/2003 | Mukerjee et al. | | |
| 2006/0285757 A1 * | 12/2006 | Abe et al. | ............. | 382/236 |
| 2008/0175490 A1 | 7/2008 | Cho et al. | | |
| 2012/0163467 A1 | 6/2012 | Kim et al. | | |

FOREIGN PATENT DOCUMENTS

| KR | 1020070009486 A | 1/2007 |
|---|---|---|
| KR | 10-2007-0093305 A | 9/2007 |

OTHER PUBLICATIONS

MPEG digital video-coding standards Sikora, T. Signal Processing Magazine, IEEE (1053-5888) 1997. vol. 14,Iss.5;p. 82-100; Source: IEEE Electronic Library Online.*

Digital video coding standards and their role in video communications Schafer, R.; Sikora, T. Proceedings of the IEEE (0018-9219) 1995. vol. 83,Iss.6;p. 907-924;Source: IEEE Electronic Library Online.*

A common framework for rate and distortion based scaling of highly scalable compressed video Taubman, D.; Zakhor, A. Circuits and Systems for Video Technology, IEEE Transactions on (1051-8215) 1996. vol. 6,Iss.4;p. 329-354; Source: IEEE Electronic Library Online.*

(Continued)

*Primary Examiner* — Andy Rao
*Assistant Examiner* — Angela Holmes
(74) *Attorney, Agent, or Firm* — Sughrue Mion, PLLC

(57) ABSTRACT

A video encoding method and apparatus, and a video decoding method and apparatus, which are capable of improving efficiency of encoding a luminance component video signal by predicting information on various encoding modes of the luminance component video signal by using a result obtained by encoding a chrominance component video signal, are provided. Accordingly, a block mode and an intra-prediction mode of the luminance component video signal are predicted from a previously encoded and recovered chrominance component video signal, and the predicted block mode and the predicted intra-prediction mode are used to encode the luminance component video signal.

19 Claims, 9 Drawing Sheets

(56) References Cited

OTHER PUBLICATIONS

Communication dated Jul. 11, 2012 issued by the Korean Intellectual Property Office in counterpart Korean Application No. 10-2008-0008029.

Communication dated Jan. 24, 2013, issued by the State Intellectual Property Office of the People's Republic China in counterpart Chinese Patent Application No. 200810149183.8.

Meng Qinglei et al.; "Fast selective algorithm of Intra prediction for H.264/AVC"; Journal of Beijing University of Aeronautics and Astronautics; Feb. 2007, vol. 33, No. 2, pp. 219-223, 14 sheets.

Communication dated Apr. 24, 2013 from the Korean Intellectual Property Office in a counterpart application No. 10-2008-0008029.

\* cited by examiner

MACRO BLOCK PARTITIONS : 16x16, 16x8, 8x16, 8x8

8x8 BLOCK PARTITIONS : 8x8, 8x4, 4x8, 4x4

VIDEO ENCODING METHOD AND APPARATUS, AND VIDEO DECODING METHOD AND APPARATUS

CROSS-REFERENCE TO RELATED PATENT APPLICATION

This application claims priority from Korean Patent Application No. 10-2008-0008029, filed on Jan. 25, 2008, in the Korean Intellectual Property Office, the disclosure of which is incorporated herein in its entirety by reference.

BACKGROUND OF THE INVENTION

1. Field of the Invention

The present invention relates to a video encoding method and apparatus, and a video decoding method and apparatus, and more particularly, to a video encoding method and apparatus, and a video decoding method and apparatus, which are capable of improving efficiency of encoding a luminance component video signal by predicting information on various encoding modes of the luminance component video signal by using a result obtained by encoding a chrominance component video signal.

2. Description of the Related Art

In general, an initial video has an RGB color format when video images are captured. A video having the RGB color format is generally encoded into a video having a YUV (or YCbCr) color format. Here, a Y component indicates luminance data including brightness information, and U (or Cb) and V (or Cr) components indicate chrominance data including color information. In the RGB video, information is uniformly distributed over R, G, and B. In the YUV (or YCbCr) video, information is concentrated on the Y component, and the amount of information on the U (or Cb) and V (or Cr) components is reduced. This is advantageous in that a compression rate is increased when compressing a YUV video. In order to additionally improve the compression rate, in general, a YUV (or YCbCr) 4:2:0 video is used by sampling chrominance components U (or Cb) and V (or Cr) of the YUV (or YCbCr) video with a ¼ size of the luminance component.

When the YUV (or YCbCr) video is compressed, in general, the Y component is encoded independently of the U (or Cb) and V (or Cr) components. For example, in the MPEG-4 AVC/H.264 standard of the Joint Video Team (JVT) of ISO/IEC MPEG and ITU-T VCEG ("Text of ISO/IEC FDIS 14496-10: Information Technology—Coding of audio-visual objects—Part 10: Advanced Video Coding", ISO/IEC JTC 1/SC 29/WG 11, N5555, March, 2003) (hereinafter, referred to as MPEG-4 AVC/H.264), when the Y component is intra-video encoded, a spatial prediction process is performed by using nine prediction methods in units of 4×4 blocks along a prediction direction. In addition, the spatial prediction process is performed by using four prediction methods in units of 16×16 blocks along the prediction direction. However, since U (or Cb) and V (or Cr) component video signals are relatively simple compared with a Y component video signal, the spatial prediction process is performed with respect to the U and V component video signals by using four prediction methods in units of 8×8 blocks along the prediction direction independently of the Y component video.

When the Y component video signal is inter-video encoded, a motion is accurately compensated for, by expanding a predicted video signal by using a 6-tap filter. On the contrary, when the U (or Cb) and V (or Cr) component video signals are inter-video encoded, a motion is compensated for by using a bilinear filter. In a conventional method, the Y component video signal and the U (or Cb) and V (or Cr) component video signals are compressed by using independent methods.

SUMMARY OF THE INVENTION

The present invention provides a method and apparatus for encoding a video signal, and a method and apparatus for decoding the encoded video signal, which are capable of improving efficiency of encoding a luminance component video signal by predicting an encoding mode of the luminance component video signal from an encoded and recovered chrominance video signal by using a correlation between the chrominance component video signal and the luminance component video signal.

According to an aspect of the present invention, there is provided a video encoding method including the operations of: encoding a first video component block of a predetermined size from a current video signal comprising at least two video components and recovering the encoded first video component block; predicting an encoding mode of a second video component block corresponding to the first video component block by using the recovered first video component block; and encoding the second video component block according to the predicted encoding mode.

According to another aspect of the present invention, there is provided a video encoding apparatus including: an encoding mode prediction unit which predicts an encoding mode of a second video component block corresponding to a first video component block by using a first video component of a predetermined size which is previously encoded and recovered in a current video signal comprising at least two video components; and an encoding unit which encodes the second video component block according to the predicted encoding mode.

According to another aspect of the present invention, there is provided a video decoding method including the operations of: decoding a first video component block of a predetermined size from a current video signal comprising at least two video components; predicting a decoding mode of a second video component block corresponding to the first video component block by using the decoded first video component block; and decoding the second video component block according to the predicted decoding mode.

According to another aspect of the present invention, there is provided a video decoding apparatus including: a decoding mode prediction unit which predicts a decoding mode of a second video component block corresponding to a first video component block by using the first video component of predetermined size which is previously decoded in a current video signal comprising at least two video components; and a decoding unit which decodes the second video component block according to the predicted decoding mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

As described above, according to a conventional technique, a luminance component video signal and a chrominance component video signal are encoded by using independent methods. This is because the amount of chrominance component data is less than that of luminance component data. However, although the chrominance component video signal has less data than the luminance component video, an edge component existing in a video commonly tends to exist in both the chrominance component video signal and the luminance component video signal. That is, in a case where an edge is detected in the chrominance component video signal, an edge may be also detected in the luminance component video signal. Directionality and a position of the detected edge may be the same in both the chrominance component video signal and the luminance component video signal. In addition, a macroblock is generally divided into sub-blocks having a smaller size and decoded. A block mode for representing a divided form of the macroblock tends to be the same in both the chrominance component video signal and the luminance component video signal. Accordingly, in the present invention, various encoding modes are predicted by using a result obtained by encoding a chrominance component video that is encoded and recovered, and the luminance component video is encoded by applying the predicted encoding mode.

Hereinafter, in the present invention, it is defined that the encoding mode includes a block mode for representing a divided form of a block obtained when a block of predetermined size is encoded and an intra-prediction mode obtained when the block of predetermined size is intra-predicted.

Figure 1:
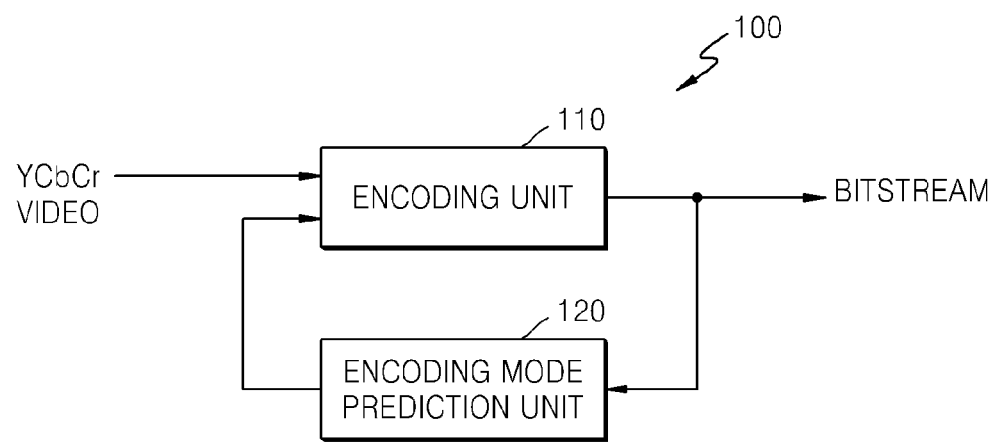
FIG. 1 is a block diagram illustrating a structure of a video encoding apparatus according to an exemplary embodiment of the present invention.

FIG. 1 is a block diagram illustrating a structure of a video encoding apparatus according to an embodiment of the present invention.

Referring to FIG. 1, a video encoding apparatus 100 includes an encoding unit 110 and an encoding mode prediction unit 120.

The encoding unit 110 firstly encodes a CbCr video signal that is a chrominance component video signal of an input YCbCr video signal. Specifically, the encoding unit 110 divides an input chrominance component video signal into macroblocks. A predicted video signal is generated by performing intra-prediction and inter-prediction processes with respect to the macroblocks. Bitstreams are generated by quantizing and entropy-encoding a difference between the predicted video signal and the input video signal. When encoding of the chrominance component video signal is completed, it is possible to determine encoding modes in which the macroblocks are encoded. This is because the encoding unit 110 encodes the macroblocks of the chrominance component video signal by applying various available encoding modes in the inter-prediction process and the intra-prediction process, compares costs of the bitstreams generated in the encoding mode with one another, and determines a prediction mode having the least cost, for example, a rate-distortion (RD) cost, as a final encoding mode of macroblocks of the chrominance component video signal.

The encoding unit 110 begins to encode the luminance component video signal after encoding the chrominance component video. The encoding unit 110 according to the current embodiment encodes the luminance component video signal by using the encoding mode that is predicted by using information on the encoding mode of the chrominance component video signal determined by using a result of encoding the chrominance component video signal and by using a correlation between the chrominance component and the luminance component.

The encoding mode prediction unit 120 predicts the encoding mode of the corresponding luminance component video signal by using the chrominance component video signal that is encoded by the encoding unit 110 and recovered.

Figure 2:
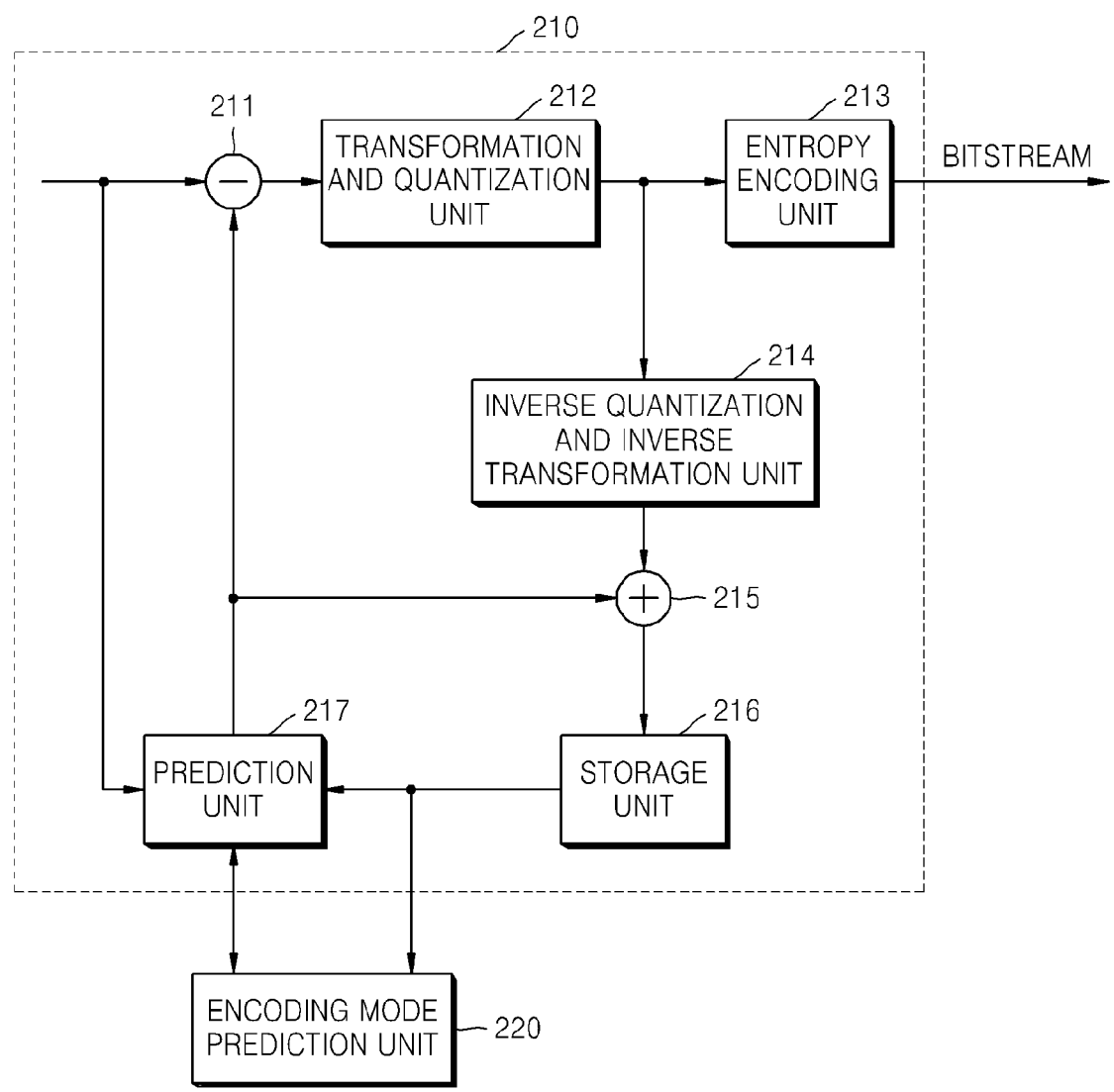
FIG. 2 is a block diagram illustrating an encoding unit shown in FIG. 1 according to an exemplary embodiment of the present invention.

FIG. 2 is a block diagram illustrating an encoding unit 110 shown in FIG. 1 according to an embodiment of the present invention. In FIG. 2, a reference numeral 210 corresponds to the encoding unit 110 of FIG. 1. Although the encoding unit 210 according to the current embodiment based on the MPEG-4 H.264/AVC standard is shown in FIG. 2, the encoding unit is not limited thereto. Various widely known compression-encoding apparatuses may be applied to the encoding unit 210.

Referring to FIG. 2, the encoding unit 210 includes a subtraction unit 211, a transformation and quantization unit 212, an entropy encoding unit 213, an inverse transformation and inverse quantization unit 214, an adding unit 215, a storage unit 216, and a prediction unit 217.

The prediction unit 217 generates a predicted chrominance component video signal by performing inter-prediction and intra-prediction processes with respect to a predetermined size of blocks of the chrominance component video. Specifically, when the inter-prediction process is performed with respect to the chrominance component video block, a motion vector is generated by predicting a motion of a current chrominance component video block in a predetermined area of a reference picture, and a predicted block is generated by acquiring an area of the reference picture pointed to by the motion vector. When the intra-prediction process is performed with respect to the chrominance component video block, a predicted chrominance component video block is generated by extending pixels of surrounding blocks which are previously encoded and recovered.

The subtraction unit 211 generates a residual chrominance component video block by subtracting the predicted chrominance component video block from the input chrominance component video block. The generated residual chrominance component video block is transformed and quantized by using the transformation and quantization unit 212. The entropy encoding unit 213 generates bitstreams by entropy-encoding the transformed and quantized residual chrominance component video block.

The transformed and quantized residual chrominance component video block is inverse-quantized and inverse-transformed by the inverse quantization and inverse transformation unit 214. The adding unit 215 recovers the chrominance component video block by adding the inverse-quantized and inverse-transformed residual chrominance component video block to the predicted chrominance component video block and stores the recovered chrominance component video block in the storage unit 216.

An encoding mode prediction unit 220 predicts an encoding mode of a luminance component video signal by using the recovered chrominance component video signal. Specifically, the encoding mode prediction unit 220 may predict a block mode of the luminance component video block by calculating the complexity of the chrominance component video block. In addition, the encoding mode prediction unit 220 may predict a block mode of a luminance component video signal corresponding to a divided form of the chrominance component video block. In addition, the encoding mode prediction unit 220 predicts an intra-prediction mode of the luminance component video block by using directionality of an edge existing in the chrominance component video block. In addition, the encoding mode prediction unit 220 may determine a divided form of the luminance component video by using the edge existing in the chrominance component video block.

Hereinafter, a procedure of predicting various encoding modes of the luminance component video signal by using the encoding mode prediction unit 220 will be described in detail.

First, a procedure of predicting a block mode of the luminance component video signal by using the chrominance component video signal will be described.

Figure 3:
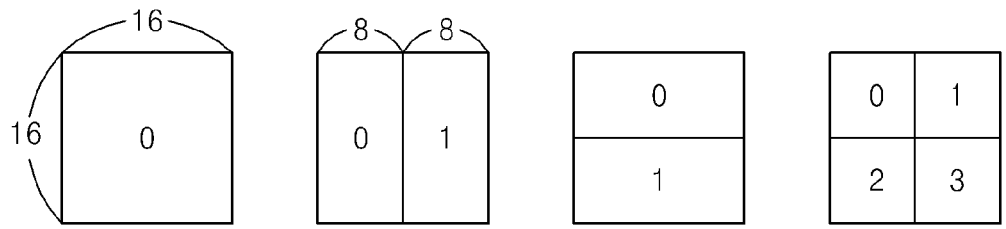
FIG. 3 illustrates a method of dividing a macroblock.
Figure 3:

FIG. 3 illustrates a method of dividing a macroblock.

Referring to FIG. 3, a 16×16 macroblock may be divided into sub-blocks having various sizes such as 16×16, 16×8, 8×16, and 8×8 and then encoded. In addition, a block having a size of 8×8 may be divided into sub-blocks having sizes such as 8×8, 8×4, 4×8, and 4×4 and then encoded. In general, in a case where the complexity of the macroblock is low, it is efficient to encode macroblocks having large sizes such as 16×16, 16×8, and 8×16. On the other hand, in a case where the complexity of the macroblock is high, it is suitable to divide macroblocks into smaller form of sub-blocks and encode the sub-blocks.

Accordingly, the encoding mode prediction unit 220 determines a divided form of the recovered chrominance component video block, that is, the block mode, by dividing the chrominance component video block into sub-blocks according to the complexity of the recovered chrominance component video block and repeatedly dividing the sub-blocks into smaller sub-blocks according to the complexities of the sub-blocks. The encoding mode prediction unit 220 predicts the block mode of the determined chrominance component video block as the block mode of the luminance component video block.

The complexity of the chrominance component video block may be calculated by using various algorithms. For example, it is possible to calculate the complexity by detecting edges in a block and calculating the amount of detected edges by using the Canny edge detection algorithm and the Sobel edge detection algorithm. Alternatively, it is possible to calculate the complexity by adding up gradients of pixels in the chrominance component video block.

Figure 4:
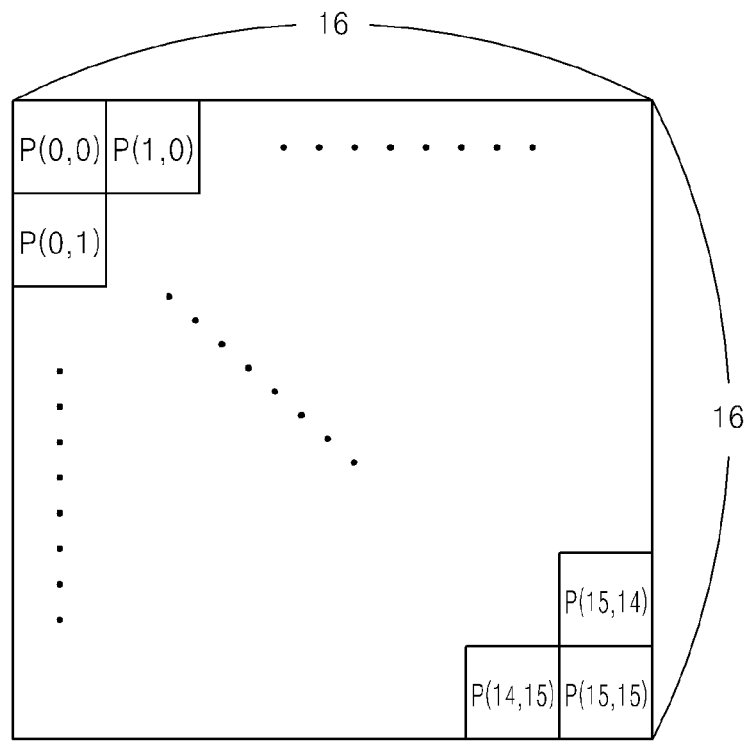
FIG. 4 illustrates a procedure for calculating the complexity of a chrominance component image block according to an exemplary embodiment of the present invention.

FIG. 4 illustrates a procedure for calculating the complexity of a chrominance component image block according to an embodiment of the present invention. In FIG. 4, P(i,j) indicates a value of a pixel located at an i-th row and a j-th column.

Referring to FIG. 4, the complexity G of a 16×16 chrominance component video block may be calculated by adding up gradients, as shown in Equation 1.

$$G = \sum_{i=0}^{15} \sum_{j=0}^{15} (|P(i,j) - P(i-1,j)| + |P(i,j) - P(i,j-1)|) \quad \text{[Equation 1]}$$

In Equation 1, a gradient at a pixel (i,j) is calculated by adding a difference in pixel values between the pixel (i,j) and a left pixel (i−1,j) thereof to a difference in pixel values between the pixel (i,j) and an upper pixel (i, j−1) thereof However, the gradient may be calculated by using various methods. For example, it is possible to determine a gradient by calculating a difference in pixel value between a pixel and another pixel spaced apart therefrom by predetermined pixels.

On the other hand, in a case where there are a plurality of chrominance components, it is preferable to predict a luminance component by concurrently using the plurality of chrominance components. This is because an edge area that is not detected in some chrominance components may be detected in other chrominance components. For example, in a case where two chrominance components Cb and Cr exist in a current video signal like a YCbCr video signal, in some situations, a clear edge area in the Cb component will be an unclear edge area in the Cr component. Alternatively, a clear edge area in the Cr component will be an unclear edge area in the Cb component. Accordingly, block complexities calculated in the Cb and Cr components have a complementary relationship with each other. Thus, when predicting the luminance component, it is preferable to concurrently use the complexities calculated in the plurality of chrominance components. In the aforementioned example, it is assumed that a complexity calculated by using a first chrominance component Cb is G1, and a complexity calculated by using a second chrominance component Cr is G2. The complexity of the current block may be defined as the maximum value of the complexities G1 and G2 or the sum of the complexities G1 and G2.

Figure 5:
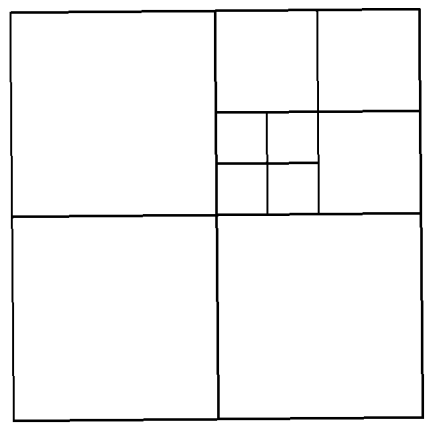
FIG. 5 illustrates an example of a divided form of a chrominance component video block.

In a case where the calculated complexity of the 16×16 chrominance component video block is equal to or less than a predetermined threshold $T_{16}$, the encoding mode prediction unit 120 maintains the form of the 16×16 chrominance component video block. In a case where the calculated complexity of the 16×16 chrominance component video block is greater than a predetermined threshold $T_{16}$, the encoding mode prediction unit 120 divides the 16×16 chrominance component video block into sub-blocks, for example 8×8 sub-blocks. Similarly, the encoding mode prediction unit 120 calculates the complexity of each 8×8 sub-blocks and compares the complexity of each 8×8 sub-block with a predetermined threshold $T_8$ and divides 8×8 sub-blocks having a complexity greater than the threshold $T_8$ into sub-blocks, for example, 4×4 sub-blocks. The procedure of dividing a block into sub-blocks may not be performed with respect to sub-blocks having a smaller size than 4×4 sub-blocks. An example of a chrominance component video block obtained through the aforementioned procedure is shown in FIG. 5.

When the block mode of the chrominance component video block is determined, the encoding mode prediction unit 120 outputs information on the block mode of the chrominance component video block to the encoding unit 110. The encoding unit 110 divides the luminance component video block and encodes the divided luminance component video block in the same block mode as the chrominance component video block. Adaptively, the encoding unit 110 independently determines a block mode of the luminance component video signal according to a general block mode determination algorithm and encodes information on a difference between the block mode predicted from the information on the block mode of the chrominance component video signal and the block mode in which a block is divided according to a practical procedure of determining a block mode as information on the block mode. In this case, a predetermined value is defined according to a divided form of each macroblock. A difference between block modes may be encoded as information on a block mode. For example, it is assumed that it is previously determined that the block mode of the macroblock to be encoded with a size of 16×16 is 0, and the block mode of the macroblock to be divided into sub-blocks with a size of 8×8 and encoded is 1. If a block mode determined by dividing the chrominance component video block according to the complexity thereof is 1 and if a block mode determined through a procedure of determining a block mode with respect to the luminance component video block is 0, it is possible to transmit only a difference value of 1 between the block modes of the luminance component video block. On the other hand, it is possible to encode the luminance component video block by dividing the luminance component video block by using a block mode of the chrominance component video block by omitting a practical procedure of determining a block mode for the luminance component video block.

Next, a procedure of predicting an intra-prediction mode of the luminance component video block by using the chrominance component video will be described.

The encoding mode prediction unit 120 detects directionality of an edge existing in the chrominance component video block by using the recovered chrominance component video block. As described above, the edge existing in the chrominance component video block may be detected by using various algorithms for detecting edges such as the Canny edge detection algorithm, the Sobel algorithm, and the like. In addition, the edge may be detected by calculating a gradient for each pixel in the block and using pixels having relatively large gradients.

Figure 6:
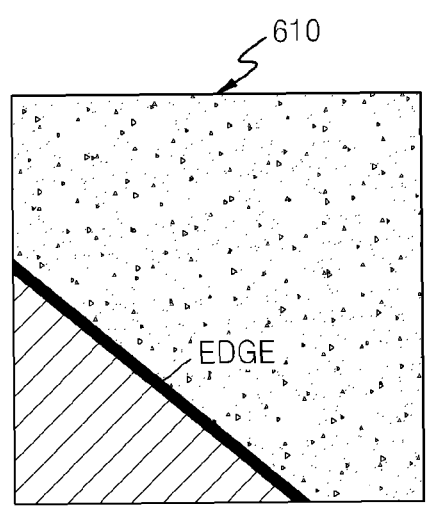
FIG. 6 illustrates an example of an edge in a chrominance component video block.

FIG. 6 illustrates an example of an edge in a chrominance component video block. As shown in FIG. 6, in a case where an edge exists in a chrominance component video block 610, both areas divided by the edge are considerably different from each other. Accordingly, when the intra-prediction process is performed, it is desirable to determine the intra-prediction direction so as to determine the intra-prediction mode in consideration of the directionality of the edge.

Figure 7A:
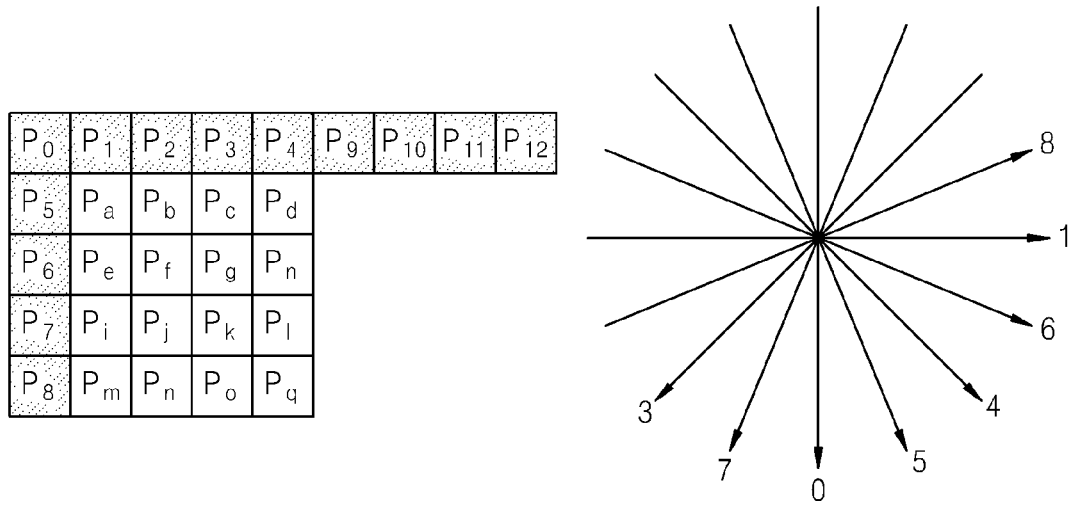
FIGS. 7A and 7B are reference views for illustrating a predicted direction and a prediction method based on an intra-prediction mode.
Figure 7B:
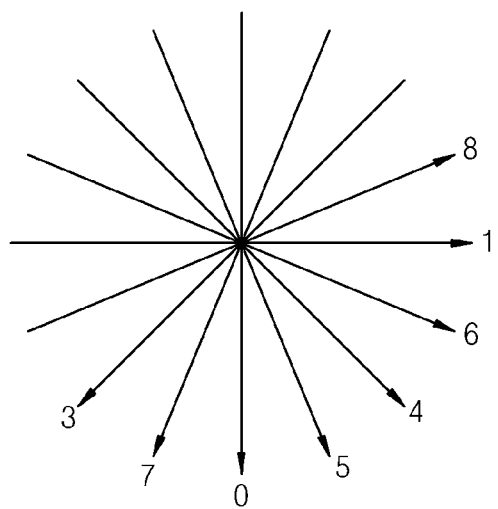

FIGS. 7A and 7B are reference views for illustrating a predicted direction and a prediction method based on an intra-prediction mode. FIG. 7A illustrates pixels of a current block to be intra-predicted and surrounding pixels of the current block. FIG. 7B illustrates available intra-prediction modes in the case of a 4×4 pixel block.

Referring to FIG. 7B, when intra-predicting a 4×4 block, one of nine prediction directions is determined as a prediction direction. A predicted video is generated by applying the determined prediction direction. For example, as shown in FIG. 7A, previously encoded and recovered neighboring data P0 to P12 is used to predict 4×4 block data Pa to Pq. If the 4×4 block is intra-predicted in a mode 0 (vertical) from among the intra-prediction modes shown in FIG. 7B, $P_1$, $P_2$, $P_3$, and $P_4$ are vertically extended, thus the pixel values of Pa, Pe, Pi and Pm are predicted from P1, the pixel values of Pb, Pf, Pj and Pn are predicted from P2, the pixel values of Pc, Pg, Pk, and Po are predicted from P3, and the pixel values of Pd, Ph, Pl, and Pq are predicted from P4.

In the case of an 8×8 pixel block, a predicted video is generated by determining one of the nine prediction directions as a prediction direction similarly to the intra-prediction process for the 4×4 block. In the case of a 16×16 pixel block, a predicted video is generated by determining one of four prediction directions (horizontal, vertical, DC, and plane directions) as a prediction direction.

The encoding mode prediction unit 120 detects a directionality of an edge existing in the chrominance component video block and outputs the detected directionality to the encoding unit 110. Then, the encoding unit 110 performs the intra-predict process with respect to the luminance component video block by applying the intra-prediction mode in a direction that is most similar to the direction of the edge existing in the chrominance component video block. For example, as shown in FIG. 6, in a case where an edge is detected in the luminance component video block 610, the intra-prediction process is performed with respect to the luminance component video block by applying the intra-prediction mode 4 with a directionality that is most similar to the direction of an edge existing in the luminance component video block 610, from among the various intra-prediction modes.

Adaptively, the encoding unit 110 determines the intra-prediction mode by independently performing the intra-prediction process with respect to the luminance component video and encodes only information on a difference between the intra-prediction mode predicted by using the directionality of the edge detected in the chrominance component video block and the intra-prediction mode determined by the practical intra-prediction process as information on the intra-prediction mode of the luminance component video block. For example, if an intra-prediction mode that is predicted by using the chrominance component video block is 4 and if an intra-prediction mode that is finally determined by applying various intra-prediction modes to corresponding luminance component video blocks is 5, only a difference of 1 between the intra-prediction modes may be transmitted as information on the intra-prediction mode. On the other hand, the encoding unit 110 may determine the intra-prediction mode of the luminance component video block, which is predicted by using the chrominance component video block, as the intra-prediction mode of the luminance component video block, as it is.

The encoding unit 110 performs an encoding process by dividing the luminance component video block into various shapes of blocks by using edges existing in the chrominance component video block unlike the conventional method of performing an encoding process by dividing macroblocks into N×M blocks. As shown in FIG. 6, when an edge is detected in the chrominance component video block 610, the encoding process is performed by dividing the luminance component video block by using the detected edge. In this case, at a decoding end, the luminance component video block is divided and decoded by using the same procedure as at an encoding end by inserting predetermined binary information on whether the block is divided by using the edge detected in the chrominance component video block into a predetermined area of a bitstream generated by encoding the luminance component video block.

Figure 8:
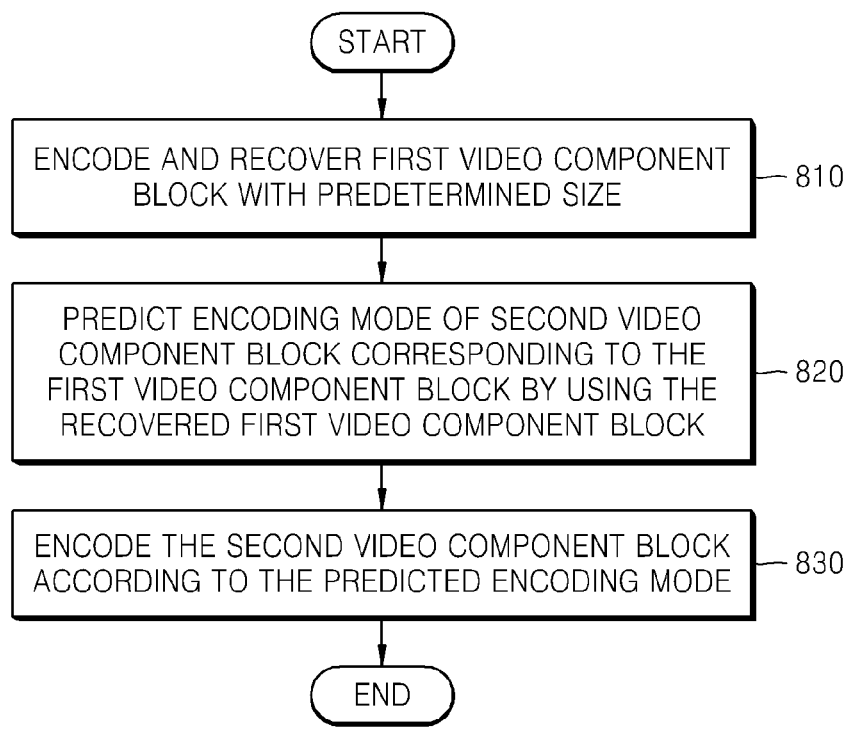
FIG. 8 is a flowchart illustrating a video encoding method according to an exemplary embodiment of the present invention.

FIG. 8 is a flowchart illustrating a video encoding method according to an embodiment of the present invention.

Referring to FIG. 8, in operation 810, a first video component block with a predetermined size included in a current video signal comprising at least two video components is encoded and recovered. For example, if the first video component is a chrominance component, the chrominance component video signal is firstly encoded and recovered.

In operation 820, an encoding mode of a second video component block corresponding to the first video component block is predicted by using the recovered first video component block. For example, an encoding mode of a luminance component video block is predicted by using the chrominance component video block. As described above, the block mode of the luminance component video block that is currently encoded is predicted by using the block mode for representing a divided form of the chrominance component video block. Alternatively, the intra-prediction mode to be applied when intra-predicting the luminance component video block is predicted by using the directionality of an edge existing in the chrominance component video block. In addition, the luminance component video block may be divided by using the edge existing in the chrominance component video block and then encoded.

In operation 830, the second video component block is encoded based on the predicted encoding mode. In this case, the luminance component video block may be encoded by applying the encoding mode predicted by using the chrominance component video to the luminance component video block. Alternatively, after determining encoding modes to be practically applied to the luminance component video block by encoding the luminance component video independently of the chrominance component video, only a difference in encoding modes between the luminance component video block and the chrominance component video block may be encoded as information on the encoding mode.

On the other hand, a cost of a bitstream of a luminance component video encoded by using the encoding mode predicted by using the chrominance component video signal in consideration of a correlation with the chrominance component video signal according to the present invention is compared with a cost of a bitstream of a luminance component video signal independently encoded without considering the correlation with the chrominance component video signal according to a conventional technique. An encoding mode used to generate a bitstream at least cost is determined as a final encoding mode of the luminance component video signal. Information on the determined final encoding mode is added to a predetermined area of the bitstream of the encoded luminance component video signal. Specifically, as described above, the encoding mode of the bitstream of the luminance component video encoded by using an encoding mode predicted by using the chrominance component video signal in consideration of the correlation with the chrominance component video signal is set to 1, and the encoding mode of the bitstream of the luminance component video signal independently encoded without considering the correlation with the chrominance component video signal according to the conventional technique is set to 0. If the information on the finally determined encoding mode obtained by comparing the cost of the bitstream of the luminance component video signal encoded according to the current embodiment with the cost of the bitstream of the luminance component video signal encoded according to the conventional technique is added to the predetermined area of the bitstream of the luminance component video signal, the decoding device determines whether the luminance component video signal that is currently to be decoded is encoded by using the encoding mode predicted in consideration of the correlation with the previously encoded chrominance component video signal or encoded independently of the chrominance component video signal by using the information on the encoding mode.

The decoding device determines whether the luminance component video block that is currently to be decoded is encoded according to the current embodiment or encoded according to the conventional technique by extracting information on the encoding mode for representing whether the encoding mode of the luminance component video block is predicted by using the chrominance component video block from the bitstream. As described above, if the information on the encoding mode of the luminance component is 1, the decoding mode of the current luminance component video block to be decoded is predicted by using a block corresponding to the previously decoded chrominance component video block, and the current luminance component video block is decoded according to the predicted decoding mode. If the information on the encoding mode of the luminance component is 0, the current luminance component video block is decoded independently of a block corresponding to the chrominance component video block according to the conventional technique. It is possible for the conventional decoding apparatus to recognize whether the bitstream is encoded according to the current embodiment or encoded according to the conventional technique by allowing the decoding apparatus to determine whether the current embodiment is applied by using the information on the encoding mode using predetermined binary information.

In the present invention, although a case where the first video component is the chromatic component and the second video component is the luminance component was described, the present invention may be applicable when encoding a video signal having a plurality of video components.

Figure 9:
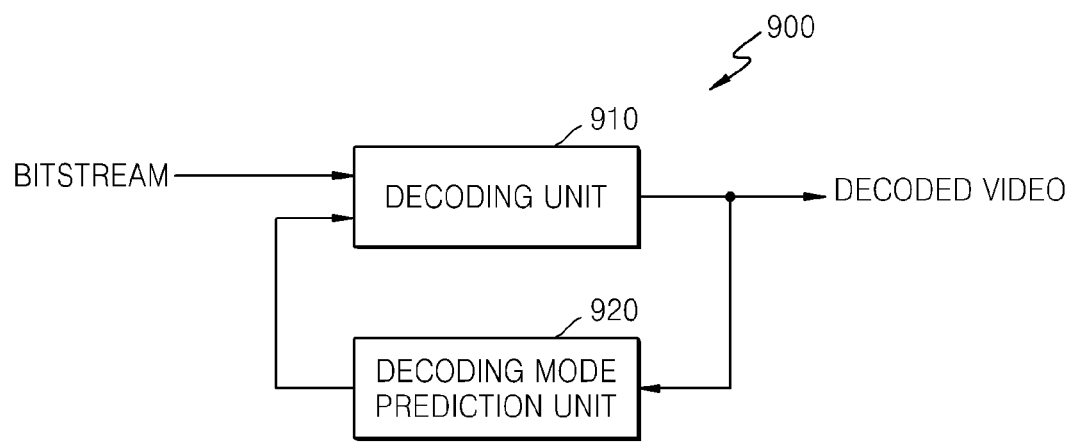
FIG. 9 is a block diagram illustrating a structure of a video decoding apparatus according to an exemplary embodiment of the present invention.
Figure 10:
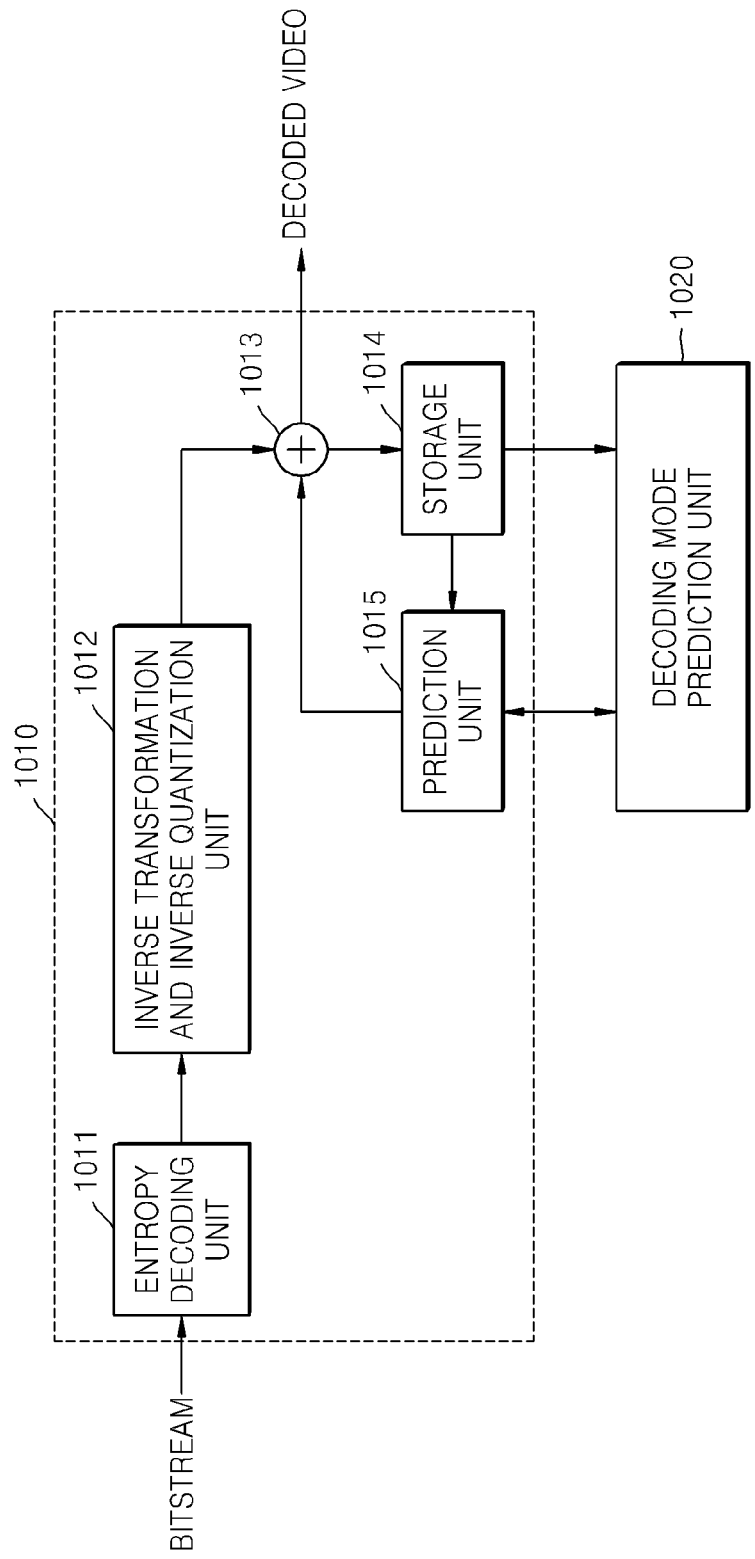
FIG. 10 is a detailed block diagram illustrating a decoding unit of FIG. 9.

FIG. 9 is a block diagram illustrating a structure of a video decoding apparatus according to an embodiment of the present invention. FIG. 10 is a detailed block diagram illustrating a decoding unit 910 of FIG. 9.

Referring to FIG. 9, a video decoding apparatus 900 includes the decoding unit 910 and a decoding mode prediction unit 920.

The decoding unit 910 firstly decodes the chrominance component video signal included in the bitstream. Specifically, referring to FIG. 10, an entropy decoding unit 1011 generates quantized coefficients by receiving the bitstream and entropy-decoding the chrominance component video signal. An inverse transformation and inverse quantization unit 1012 generates a residual of the chrominance component video signal by inverse-quantizing and inverse-transforming the quantized coefficients. A prediction unit 1015 generates a predicted video signal by predicting the chrominance video signal and outputs the predicted video signal to an adding unit 1013. The adding unit 1013 recovers the chrominance component video signal by adding the residual to the predicted video signal and stores the recovered chrominance component video signal in the storage unit 1014.

The decoding mode prediction unit 920 predicts the decoding mode for decoding a luminance component video block that is currently to be decoded by using the decoded chrominance component video signal and outputs the predicted decoding mode to the decoding unit 910. An operation of the decoding mode prediction unit 920 is similar to that of the encoding mode prediction unit 120 of FIG. 1. That is, the decoding mode prediction unit 920 determines a block mode by dividing a chrominance component video block according to the complexity of the decoded chrominance component video block and predicts the determined block mode as the block mode of the luminance component video block that is currently to be decoded. In addition, the decoding mode prediction unit 920 predicts an intra-prediction mode by detecting a directionality of an edge existing in the decoded chrominance component video block and transmits the intra-prediction mode to the decoding unit 910. The decoding unit 910 performs the intra-prediction process with respect to the luminance component video block in the prediction direction according to the intra-prediction mode.

On the other hand, in a case where the luminance component block that is currently to be decoded is divided and encoded by using an edge existing in the chrominance component video block, the decoding mode prediction unit 920 detects the edge existing in the chrominance component video block and transmits the detected edge to the decoding unit 910. The decoding unit 910 divides the luminance component video block by using the detected edge and then decodes the divided luminance component video block.

Figure 11:
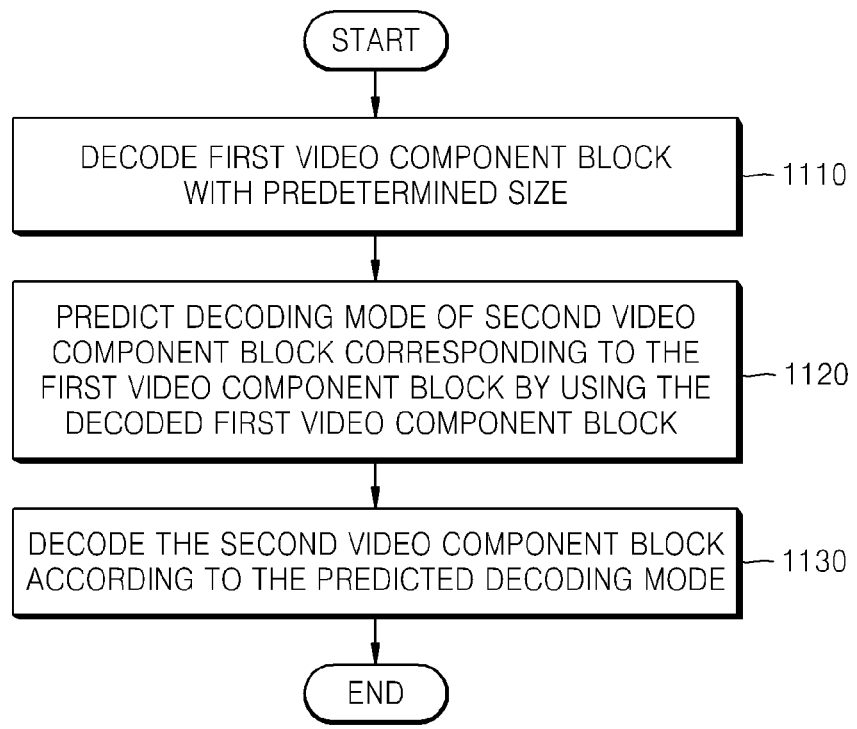
FIG. 11 is a flowchart illustrating a video decoding method according to an exemplary embodiment of the present invention.

FIG. 11 is a flowchart illustrating a video decoding method according to an embodiment of the present invention.

Referring to FIG. 11, in operation 1110, a bitstream obtained by encoding a current video signal comprising at least two video components is received, and a first video component block of predetermined size is decoded from the received bitstream. For example, if the first video component is a chrominance component, the chrominance component is firstly decoded.

In operation 1120, a decoding mode of a second video component corresponding to the first video component block is predicted by using the decoded first video component block. For example, a decoding mode of a luminance component video block is predicted by using the chrominance component video block. As described above, a block mode of the luminance component video block that is currently to be decoded is predicted by using a block mode for representing a divided form of the chrominance component video block, or an intra-prediction mode to be applied when intra-predicting the luminance component video block is predicted by using a directionality of an edge existing in the chrominance component video block. In addition, the luminance component video block is divided by using the edge existing in the chrominance component video block and is then decoded.

In operation 1130, the second video component block is decoded according to the predicted decoding mode.

In the aforementioned example, a case where a chrominance component video signal and a luminance component video signal have the same size was described. However, a video signal may have one of various formats. The size of the chrominance component video signal may be different from that of the luminance component video signal according to the formats. Even in this case, it is possible to predict the encoding mode of a luminance component by using a chrominance component block at a corresponding position so as to determine the encoding mode of a block corresponding to the luminance component. For example, in a YCbCr 4:2:0 format, the video size of the chrominance component is half the video size of the luminance component in horizontal and vertical directions. In this case, an encoding mode of a 16×16 luminance component block may be predicted by using 8×8 chrominance component blocks.

According to an embodiment of the present invention it is possible to improve efficiency of predicting a luminance component video signal by encoding the luminance component video signal by using a correlation between a chrominance component video signal and the luminance component video signal. Accordingly, efficiency of compressing the luminance component video signal is also improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The invention can also be embodied as computer readable codes on a computer readable transmission medium. The computer readable transmission medium is any medium that can transmit data which can be thereafter read by a computer system. Examples of the computer readable transmission medium include carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A video encoding method comprising:
encoding a first video component block of a predetermined size from a current video signal comprising at least two video components and recovering the encoded first video component block;
predicting an encoding mode of a second video component block corresponding to the first video component block from the firstly encoded and recovered first video component block by using a correlation between the first video component block and the second video component block; and
encoding the second video component block according to the predicted encoding mode,
wherein the encoding mode of the second video component includes at least one of a block mode for representing a divided form of the second video component block and an intra-prediction mode of the second video component block,
wherein the predicting comprises determining a block mode of the first video component block by determining a final divided form of the first video component block by dividing the first video component block into sub-blocks by using a complexity of the recovered first video component block, and repeatedly dividing the sub-blocks into sub-blocks of smaller size according to a complexity of the sub-blocks and dividing the second video component block according to the same block mode as the determined block mode of the first video component, and
wherein in the determining of the block mode of the first video component block, in a case where a size of an edge component included in the first video component block is greater than a predetermined first threshold, the first video component block is divided into sub-blocks of smaller size, and a final divided form of the first video component block is determined by repeatedly dividing sub-blocks having an edge component greater than a second threshold into sub-blocks of smaller size.

2. The video encoding method of claim 1, wherein the first video component is a chrominance component, and the second video component is a luminance component.

3. The video encoding method of claim 1, wherein the prediction of the encoding mode of the second video component block comprises:
detecting directionality of an edge included in the recovered first video component block; and determining an intra-prediction mode having directionality that is most similar to that of the edge included in the first video component block as an intra-prediction mode to be applied to the second video component block.

4. The video encoding method of claim 1, wherein the prediction of the encoding mode of the second video component block comprises:
   detecting an edge included in the recovered first video component block; and
   dividing the second video component block by using the detected edge included in the first component block.

5. The video encoding method of claim 1, wherein the encoding of the second video component block comprises:
   generating a first bitstream by encoding the second video component block according to the predicted encoding mode;
   generating a second bitstream by encoding the second video component block independently of the predicted encoding mode; and
   determining an encoding mode that can be applied to a bitstream at least cost as a final encoding mode of the second video component block by comparing the first and second bitstreams.

6. The video encoding method of claim 1, wherein predetermined binary information for representing whether the encoding mode of the second video component block is predicted by using the recovered first video component block is added to a predetermined area of a bitstream.

7. A video encoding apparatus comprising:
   an encoding mode prediction unit comprising a circuit for predicting an encoding mode of a second video component block corresponding to a first video component block from the first video component of a predetermined size which is firstly encoded and recovered in a current video signal comprising at least two video components by using a correlation between the first video component block and the second video component block; and
   an encoding unit comprising a circuit for encoding the second video component block according to the predicted encoding mode,
   wherein the encoding mode of the second video component includes at least one of a block mode for representing a divided form of the second video component block and an intra-prediction mode of the second video component block, and
   wherein the encoding mode prediction unit determines a block mode of the first video component block by determining a final divided form of the first video component block by dividing the first video component block into sub-blocks by using a complexity of the recovered video component block and repeatedly dividing the sub-blocks into sub-blocks of smaller size according to a complexity of the sub-blocks and predicts the same block mode as the determined block mode of the first video component as a block mode of the second video component block.

8. The video encoding apparatus of claim 7, wherein the first video component is a chrominance component, and the second video component is a luminance component.

9. The video encoding apparatus of claim 7, wherein the encoding mode prediction unit detects a directionality of an edge included in the recovered first video component block and determines an intra-prediction mode having a directionality that is most similar to that of the edge included in the first video component block as an intra-prediction mode to be applied to the second video component block.

10. The video encoding apparatus of claim 7, wherein the encoding mode prediction unit detects an edge included in the recovered first video component block and divides the second video component block by using the detected edge included in the first component block.

11. The video encoding apparatus of claim 7, wherein the encoding unit generates a first bitstream by encoding the second video component block according to the predicted encoding mode, generates a second bitstream by encoding the second video component block independently of the predicted encoding mode, and determines an encoding mode applied to a bitstream at least cost as a final encoding mode of the second video component block by comparing the first and second bitstreams with each other.

12. A video decoding method comprising:
   decoding a first video component block of a predetermined size from a current video signal comprising at least two video components;
   predicting a decoding mode of a second video component block corresponding to the first video component block from the firstly decoded first video component block by using a correlation between the first video component block and the second video component block; and
   decoding the second video component block according to the predicted decoding mode,
   wherein the decoding mode of the second video component includes at least one of a block mode for representing a divided form of the second video component block and an intra-prediction mode of the second video component block, and
   wherein the predicting comprises determining a block mode of the first video component block by determining a final divided form of the first video component block by dividing the first video component block into sub-blocks by using a complexity of the decoded first video component block and repeatedly dividing the sub-blocks into sub-blocks of smaller size according to a complexity of the sub-blocks, and dividing the second video component block according to the same block mode as the determined block mode of the first video component.

13. The video decoding method of claim 12, wherein the first video component is a chrominance component, and the second video component is a luminance component.

14. The video decoding method of claim 12, wherein the prediction of the decoding mode of the second video component block comprises:
   detecting a directionality of an edge included in the recovered first video component block; and
   determining an intra-prediction mode having a directionality that is most similar to that of the edge included in the first video component block as an intra-prediction mode to be applied to the second video component block.

15. The video decoding method of claim 12, wherein the prediction of the decoding mode of the second video component block comprises:
   detecting an edge included in the recovered first video component block; and
   dividing the second video component block by using the detected edge included in the first component block.

16. A video decoding apparatus comprising:
   a decoding mode prediction unit comprising a circuit for predicting a decoding mode of a second video component block corresponding to a first video component block from the first video component of predetermined size which is firstly decoded in a current video signal comprising at least two video components by using a correlation between the first video component block and the second video component block; and a decoding unit comprising a circuit for decoding the second video component block according to the predicted decoding mode, wherein the decoding mode of the second video component includes at least one of a block mode for representing a divided form of the second video component block and an intra-prediction mode of the second video component block, and wherein the decoding mode prediction unit determines a block mode of the first video component block by determining a final divided form of the first video component block by dividing the first video component block into sub-blocks by using a complexity of the decoded first video component block and repeatedly dividing the sub-blocks into sub-blocks of smaller size according to a complexity of the sub-blocks and divides the second video component block according to the same block mode as the determined block mode of the first video component.

17. The video decoding apparatus of claim 16, wherein the first video component is a chrominance component, and the second video component is a luminance component.

18. The video decoding apparatus of claim 16, wherein the decoding mode prediction unit detects a directionality of an edge included in the recovered first video component block and determines an intra-prediction mode having a directionality that is most similar to that of the edge included in the first video component block as an intra-prediction mode to be applied to the second video component block.

19. The video decoding apparatus of claim 16, wherein the decoding mode prediction unit detects an edge included in the recovered first video component block and divides the second video component block by using the detected edge included in the first component block.

* * * * *